United States Patent
Yao et al.

(10) Patent No.: US 12,423,202 B2
(45) Date of Patent: Sep. 23, 2025

(54) BIOS PROBLEM POSITIONING METHOD AND APPARATUS, AND COMPUTER READABLE STORAGE MEDIUM

(71) Applicant: INSPUR SUZHOU INTELLIGENT TECHNOLOGY CO., LTD., Suzhou (CN)

(72) Inventors: Fanyi Yao, Suzhou (CN); Daotong Li, Suzhou (CN); Bing Wang, Suzhou (CN); Shanbin Ai, Suzhou (CN); Xiuqiang Sun, Suzhou (CN)

(73) Assignee: INSPUR SUZHOU INTELLIGENT TECHNOLOGY CO., LTD, Suzhou (CN)

( * ) Notice: Subject to any disclaimer, the term of this patent is extended or adjusted under 35 U.S.C. 154(b) by 63 days.

(21) Appl. No.: 18/260,424

(22) PCT Filed: Dec. 30, 2021

(86) PCT No.: PCT/CN2021/143265
§ 371 (c)(1),
(2) Date: Jul. 5, 2023

(87) PCT Pub. No.: WO2022/148300
PCT Pub. Date: Jul. 14, 2022

(65) Prior Publication Data
US 2024/0303168 A1 Sep. 12, 2024

(30) Foreign Application Priority Data
Jan. 7, 2021 (CN) .................. 202110019432.7

(51) Int. Cl.
*G06F 9/00* (2018.01)
*G06F 11/22* (2006.01)
*G06F 15/177* (2006.01)

(52) U.S. Cl.
CPC ................. *G06F 11/2284* (2013.01)

(58) Field of Classification Search
CPC .................................. G06F 11/2284
See application file for complete search history.

(56) References Cited

U.S. PATENT DOCUMENTS

| | | | |
|---|---|---|---|
| 2012/0066429 A1* | 3/2012 | Daftardar | G06F 1/24 |
| | | | 711/E12.019 |
| 2012/0068985 A1* | 3/2012 | Tsai | G06F 11/3031 |
| | | | 345/211 |

(Continued)

FOREIGN PATENT DOCUMENTS

| | | |
|---|---|---|
| CN | 104391765 A | 3/2015 |
| CN | 108920296 A | 11/2018 |

(Continued)

OTHER PUBLICATIONS

Translation Wang Jianhua, Mar. 6, 2020.*

(Continued)

*Primary Examiner* — Mohammed H Rehman
(74) *Attorney, Agent, or Firm* — Maschoff Brennan

(57) ABSTRACT

Disclosed in embodiments of the present application are a BIOS problem locating method and apparatus, and a medium. The method includes: constructing functional modules according to historical sample data; according to node information corresponding to each functional module, dividing data codes corresponding to the functional modules into data sub-codes; determining target identifier information according to correspondence between the data sub-codes and identifier information; when a problem occurs to a certain data sub-code, storing the target identifier information to a preset memory; and if an anomaly occurs to BIOS (Continued)

operation, according to the target identifier information recorded in the memory, quickly locating the abnormal target data sub-code.

19 Claims, 3 Drawing Sheets

(56) References Cited

U.S. PATENT DOCUMENTS

| | | |
|---|---|---|
| 2012/0278655 A1 | 11/2012 | Lin et al. |
| 2016/0162379 A1* | 6/2016 | Sim ................ G06F 11/2284 713/2 |
| 2016/0210091 A1* | 7/2016 | Martin ............. G06F 3/1217 |
| 2018/0046571 A1 | 2/2018 | Magill et al. |
| 2018/0157525 A1* | 6/2018 | Song ................. G06F 13/24 |
| 2024/0345915 A1* | 10/2024 | Liu ................ G06F 11/0778 |

FOREIGN PATENT DOCUMENTS

| | | | | |
|---|---|---|---|---|
| CN | 110866258 A | * | 3/2020 | ............ G06F 21/57 |
| CN | 111176945 A | | 5/2020 | |
| CN | 112732503 A | | 4/2021 | |

OTHER PUBLICATIONS

International Search Report and Written Opinion issued by the China National Intellectual Property Administration acting as International Searching Authority for International Patent Application No. PCT/CN2021/143265 dated Mar. 9, 2022 (14 total pages—with translation).

Notification to Grant Patent issued by the China National Intellectual Property Administration dated Nov. 10, 2022 (5 total pages—with translation).

* cited by examiner

BIOS PROBLEM POSITIONING METHOD AND APPARATUS, AND COMPUTER READABLE STORAGE MEDIUM

CROSS REFERENCES TO RELATED APPLICATIONS

The present application claims the priority of International Patent Application No. PCT/CN2021/143265 filed on Dec. 30, 2021, which claims priority to the Chinese Patent Application No. 202110019432.7, filed to the Chinese Patent Office on Jan. 7, 2021 and entitled "BIOS Problem Locating Method and Apparatus, and Computer-Readable Storage Medium", their entire contents of which are incorporated herein by reference.

PRIOR ART

The present application relates to the technical field of servers, in particular to a BIOS problem locating method and apparatus, and a computer-readable storage medium.

BACKGROUND OF THE INVENTION

With the quick development of a server technology, the usability, performances and functions are increasingly enhanced. As functions increase, the stability and reliability of a server may be lowered therewith, however, the stability and the reliability are user's basic requirements for a server system. As the lowest-level and directest hardware setting and control manager for a mainboard of the server, a Basic Input Output System (BIOS) may provide more simple usable functions for the server. The BIOS is a set of programs on a Read Only Memory image (ROM) chip fixed to the mainboard, stores the most important basic input output program, system setting information, a program for self-check after boot-up and a system self-booting program of a computer, and has the main function of providing the lowest-level and directest hardware setting and control for the computer.

As the most important constituent unit of the server, the BIOS brings a great impact on the stability and reliability of the server. Sometimes, if some complex BIOS problems which are unable to be located are encountered during boot-up, it is usually necessary to enable a debugging function, i.e., a BIOS serial port log function, then, a system runs and is rebooted for test, serial port information when problems occur is copied and collected for problem analysis.

Usually, this method has the following defects: 1) the boot-up speed of the BIOS becomes lower after the debugging function is enabled, and if a problem difficult to copy at a low probability is encountered, it may take more time to copy the problem; and 2) some problems may be copied when the debugging function is disenabled, but may not be copied after the debugging function is enabled.

It may be seen that how to improve the problem analysis efficiency is a problem that needs to be solved by those skilled in the art.

SUMMARY OF THE INVENTION

Objectives of embodiments of the present application are to provide a BIOS problem locating method and apparatus, and a computer-readable storage medium, by which the problem analysis efficiency may be improved.

In order to solve the above-mentioned technical problems, an embodiment of the present application provides a BIOS problem locating method, including:
constructing functional modules according to historical sample data, where the historical sample data includes historical functional modules to which a BIOS serial port information copying problem has occurred;
dividing data codes corresponding to each of the functional modules into data sub-codes according to node information corresponding to each of the functional modules;
querying a pre-established correspondence between the data sub-codes and identifier information to determine target identifier information in response to the execution of the data codes of each of the functional modules; and storing the target identifier information to a preset memory; and
locating abnormal target data sub-codes according to the target identifier information recorded in the memory in a case that an anomaly occurs to BIOS operation.

In an embodiment of the present application, the step of locating abnormal target data sub-codes according to the target identifier information recorded in the memory in a case that an anomaly occurs to BIOS operation includes:
judging, in a case that an anomaly occurs to BIOS operation, whether complete serial port information is acquired within a preset time;
reading the target identifier information corresponding to each of the functional modules from the memory in a case that the complete serial port information is unable to be acquired within the preset time;
selecting abnormal identifier information from all the target identifier information; and
determining, according to the correspondence between the data sub-codes and the identifier information, the target data sub-codes corresponding to the abnormal identifier information.

In an embodiment of the present application, after the step of determining, according to the correspondence between the data sub-codes and the identifier information, the target data sub-codes corresponding to the abnormal identifier information, the method further includes:
converting the abnormal identifier information into text information according to a preset correspondence between the identifier information and the text information.

In an embodiment of the present application, after the step of storing the target identifier information to a preset memory, the method further includes:
recording, according to state information fed back after each time of writing data into the memory, a state identifier corresponding to the data written into the memory each time, where the state identifier includes a valid identifier and an invalid identifier; and
correspondingly, after the step of selecting abnormal identifier information from all the target identifier information, the method includes:
judging whether the state identifier corresponding to the abnormal identifier information is the valid identifier; and
performing, in a case that the state identifier corresponding to the abnormal identifier information is the valid identifier, the step of determining, according to the correspondence between the data sub-codes and the identifier information, the target data sub-codes corresponding to the abnormal identifier information.

In an embodiment of the present application, after the step of locating abnormal target data sub-codes according to the target identifier information recorded in the memory, the method further includes:

setting a serial port information printing function for the target data sub-codes.

In an embodiment of the present application, the step of storing the target identifier information to a preset memory includes:

determining a position to be occupied by each of the functional modules in the memory according to a capacity of the memory, the number of the functional modules and the node information corresponding to each of the functional modules; and storing the target identifier information to the position, which corresponds to the target identifier information, in the memory in a case that the target identifier information is acquired.

An embodiment of the present application further provides a Basic Input Output System (BIOS) problem locating apparatus, including a construction unit, a division unit, a querying unit, a storage unit, and a locating unit;

the construction unit being configured to construct functional modules according to historical sample data, where the historical sample data includes historical functional modules to which a BIOS serial port information copying problem has occurred;

the division unit being configured to divide data codes corresponding to each of the functional modules into data sub-codes according to node information corresponding to each of the functional modules;

the querying unit being configured to query a pre-established correspondence between the data sub-codes and identifier information to determine target identifier information in response to the execution of the data codes of each of the functional modules;

the storage unit being configured to store the target identifier information to a preset memory; and the locating unit being configured to locate the abnormal target data sub-codes according to the target identifier information recorded in the memory in a case that an anomaly occurs to BIOS operation.

In an embodiment of the present application, the locating unit includes a judgment subunit, a reading subunit, a selection subunit, and a determination subunit;

the judgment subunit is configured to judge, in a case that an anomaly occurs to BIOS operation, whether complete serial port information is acquired within a preset time;

the reading subunit is configured to read the target identifier information corresponding to each of the functional modules from the memory in a case that the complete serial port information is unable to be acquired within the preset time;

the selection subunit is configured to select abnormal identifier information from all the target identifier information; and the determination subunit is configured to determine, according to the correspondence between the data sub-codes and the identifier information, the target data sub-codes corresponding to the abnormal identifier information.

In an embodiment of the present application, the apparatus further includes a conversion unit; where the conversion unit is configured to convert the abnormal identifier information into text information according to a preset correspondence between the identifier information and the text information.

In an embodiment of the present application, the apparatus further includes a recording unit and a judgment unit; where the recording unit is configured to record, according to state information fed back after each time of writing data into the memory, a state identifier corresponding to the data written into the memory each time, where the state identifier includes a valid identifier and an invalid identifier; and the judgment unit is configured to judge whether the state identifier corresponding to the abnormal identifier information is the valid identifier; and trigger the determination subunit to perform, in a case that the state identifier corresponding to the abnormal identifier information is the valid identifier, the step of determining, according to the correspondence between the data sub-codes and the identifier information, the target data sub-codes corresponding to the abnormal identifier information after the step of selecting abnormal identifier information from all the target identifier information.

In an embodiment of the present application, the apparatus further includes a setting unit; where the setting unit is configured to set a serial port information printing function for the target data sub-codes.

In an embodiment of the present application, the storage unit is configured to determine a position to be occupied by each of the functional modules in the memory according to a capacity of the memory, the number of the functional modules and the node information corresponding to each of the functional modules; and store the target identifier information to the position, which corresponds to the target identifier information, in the memory in a case that the target identifier information is acquired.

An embodiment of the present application further provides a Basic Input Output System (BIOS) problem locating apparatus, including:

a memory configured to store a computer program; and a processor configured to execute the computer program so as to implement the steps of any one of the BIOS problem locating methods.

An embodiment of the present application further provides a computer-readable storage medium, having stored thereon a computer program which, when executed by a processor, implements the steps of any one of the BIOS problem locating methods.

It may be seen from the above-mentioned technical solutions that functional modules are constructed according to historical sample data, where the historical sample data includes historical functional modules to which a BIOS serial port information copying problem has occurred. In a case that data codes of the functional modules are executed, positions where problems are prone to occur to the data codes may be used as nodes, there is a difference in node information corresponding to different functional modules, and data codes corresponding to each of the functional modules are divided into data sub-codes according to node information corresponding to each of the functional modules. In order to characterize a running condition of each of the functional modules, a correspondence between the data sub-codes and identifier information may be pre-established, and target identifier information in response to the execution of the data codes of each of the functional modules may be determined by querying the correspondence. In a case that a problem occurs to a certain data sub-code, the functional module may stop at a position of the data sub-code where the problem occurs, thereby enabling the subsequent data sub-codes not to be executed. In the technical solutions, the identifier information corresponding to the current stop position of the functional module may be taken as the target identifier information, and the target identifier information is stored to a preset memory; and abnormal target data sub-codes may be quickly located according to the target identifier information recorded in the memory in a case that an anomaly occurs to BIOS operation, so that problem analysis may be performed on the target data sub-codes, and the problem analysis efficiency is effectively improved.

BRIEF DESCRIPTION OF DRAWINGS

In order to describe the embodiments of the present application more clearly, the accompanying drawings required to be used in the embodiments will be briefly introduced below. Apparently, the accompanying drawings in the following description show only some embodiments of the present application, and those of ordinary skill in the art may still derive other accompanying drawings from these accompanying drawings without creative efforts.

DETAILED DESCRIPTION OF THE INVENTION

The technical solutions in the embodiments of the present application will be described clearly and completely below in conjunction with the accompanying drawings in the embodiments of the present application. Apparently, the described embodiments are a part of the embodiments of the present application, not all the embodiments. Based on the described embodiments of the present application, all other embodiments obtained by those of ordinary skill in the art without creative efforts fall within the protection scope of the present application.

In order to make those skilled in the art to better understand the solutions in the present application, the present application is further described in detail below in conjunction with the accompanying drawings and specific implementations.

Figure 1:
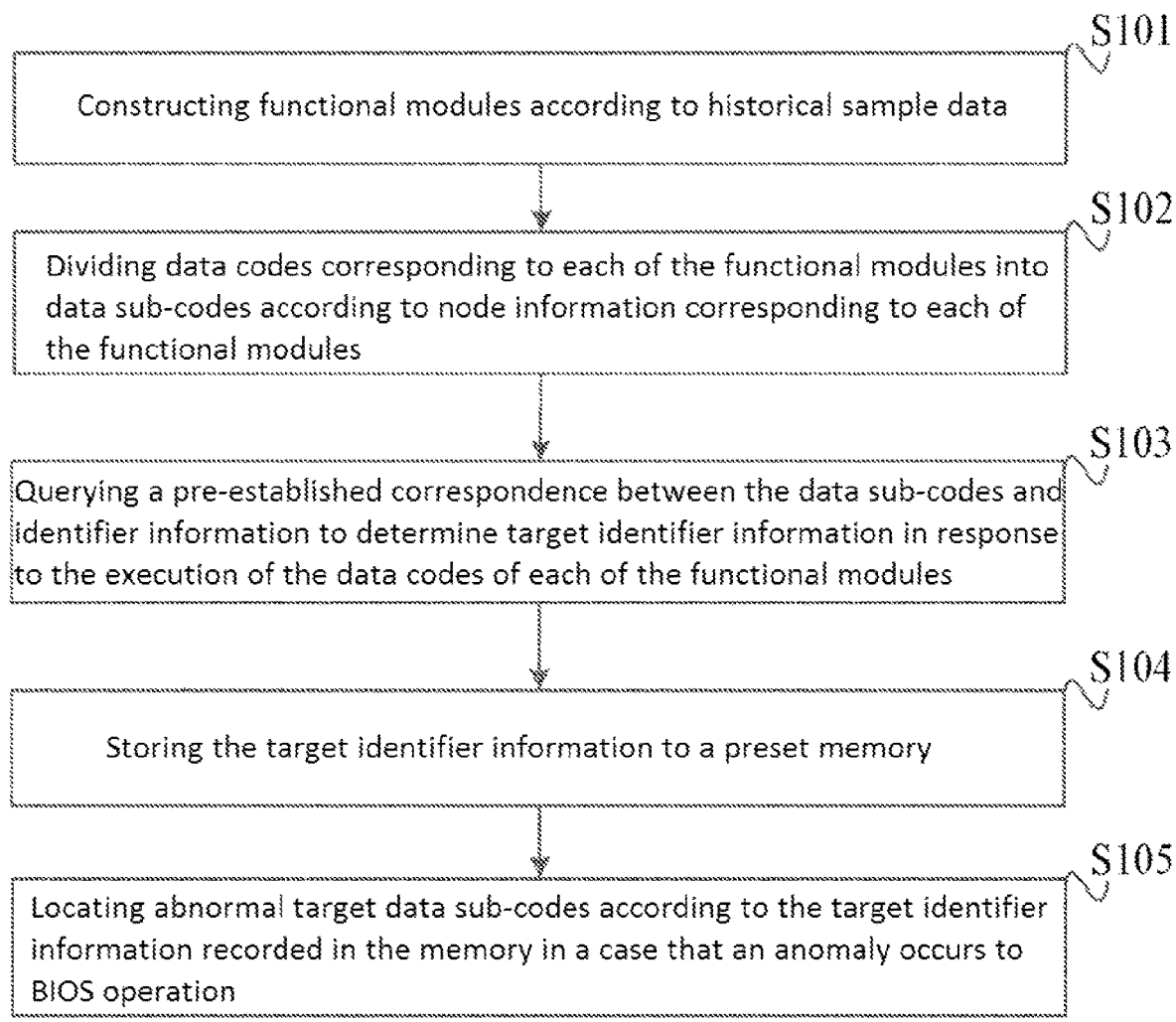
FIG. 1 is a flow chart of a BIOS problem locating method provided in an embodiment of the present application.

Next, a BIOS problem locating method provided in an embodiment of the present application is introduced in detail. FIG. 1 is a flow chart of a BIOS problem locating method provided in an embodiment of the present application. The method includes:

S101: functional modules are constructed according to historical sample data.

According to different functions required to be achieved, different functional modules may be involved in a case that a BIOS boots up to run. In an embodiment of the present application, historical functional modules to which a BIOS serial port information copying problem has occurred within a period of time may be summarized as the historical sample data. For example, historical functional modules to which the BIOS serial port information copying problem has occurred within one week may be counted.

S102: data codes corresponding to each of the functional modules are divided into data sub-codes according to node information corresponding to each of the functional modules.

In a case that a data code of a same functional module is executed repeatedly, a position where a problem occurs during execution performed each time may be different. Therefore, in an embodiment of the present application, positions where problems are prone to occur in a case that the data codes of the functional modules are executed may be counted, the positions where problems are prone to occur are used as nodes, one functional module generally corresponds to a plurality of nodes, and the plurality of nodes may be summarized as node information corresponding to the functional module.

There is a difference in node information corresponding to different functional modules, the data codes corresponding to each of the functional modules are divided into a plurality of data sub-codes according to the node information corresponding to each of the functional modules.

S103: a pre-established correspondence between the data sub-codes and identifier information is queried to determine target identifier information in response to the execution of the data codes of each of the functional modules.

In order to characterize a running condition of each of the functional modules, the correspondence between the data sub-codes and the identifier information may be pre-established, and the target identifier information in response to the execution of the data codes of each of the functional modules may be determined by querying the correspondence.

In a case that a problem occurs to a certain data sub-code, the functional module may stop at a position of the data sub-code where the problem occurs, thereby enabling the subsequent data sub-codes not to be executed. At the moment, identifier information corresponding to the data sub-code where the problem occurs is target identifier information in response to the execution of the data code of the functional module.

S104: the target identifier information is stored to a preset memory.

In order to facilitate subsequent quick fault location, the target identifier information corresponding to each of the functional modules may be stored to the preset memory.

In order to ensure orderly storage of the target identifier information of each of the functional modules, during practical application, a position to be occupied by each of the functional modules in the memory may be determined according to a capacity of the memory, the number of the functional modules and the node information corresponding to each of the functional modules; and the target identifier information is stored to the position, which corresponds to the target identifier information, in the memory in a case that the target identifier information is acquired.

For example, it is assumed that there are three functional modules, node information corresponding to a first functional module includes ten nodes, node information corresponding to a second functional module includes twenty nodes, and node information corresponding to a third functional module includes five nodes, at the moment, the capacity of the memory may be sequentially distributed to the first functional module, the second functional module and the third functional module according to a ratio of 2:4:1.

During practical application, all the functional modules only correspond to one piece of target identifier information in a case that all the functional modules are executed in order, and in this case, the target identifier information of the functional modules may be stored by adopting one byte of the memory.

In a case that all the functional modules are not executed in order, an independent byte may be distributed to each of the functional modules for storing the target identifier information corresponding to each of the functional modules.

S105: abnormal target data sub-codes are located according to the target identifier information recorded in the memory in a case that an anomaly occurs to BIOS operation.

During practical application, firstly, it may be judged, in a case that an anomaly occurs to BIOS operation, whether complete serial port information is acquired within a preset time; in a case that the complete serial port information may be acquired within the preset time, it is proven that fault location may be performed according to the serial port information; and in a case that the complete serial port information is unable to be acquired within the preset time, it is proven that it may take more time to copy the complete serial port information or serial port information where a problem occurs is unable to be copied after a debugging function is enabled, at the moment, in order to locate and analyze a fault, the target identifier information corresponding to each of the functional modules may be read from the memory; abnormal identifier information is selected from all the target identifier information; and the target data sub-codes corresponding to the abnormal identifier information are determined according to the correspondence between the data sub-codes and the identifier information.

During practical application, identifier information is often presented in a form of a string. In order to facilitate users to intuitively understand a meaning represented by the abnormal identifier information, a correspondence between the identifier information and text information may be pre-established, and after the target data sub-codes corresponding to the abnormal identifier information are determined, the abnormal identifier information may be converted into text information according to the preset correspondence between the identifier information and the text information.

For a functional module acquiring field replaceable unit (FRU) information from a baseboard management controller (BMC) to be updated to a system management BIOS (SMBIOS), a data code of the functional module may be divided into seven data sub-codes, a situation of abnormal execution of each of the data sub-codes may be characterized by adopting different identifiers, for example, 01 indicates that the data code of the functional module is unable to be executed; 02 indicates that the data code of the function module fails to interact with the BMC, and the FRU information is unable to be acquired; 03 indicates that the data code of the function module successfully interacts with the BMC, but the FRU information is invalid; 04 indicates that it fails to store the FRU information to a BIOS Flash; 05 indicates that it fails to access the stored FRU information from the Flash in a case that the FRU information is invalid; 06 indicates that the data code of the functional module is unable to read records of the SMBIOS; and 07 indicates that the records of the SMBIOS may be read, but the SMBIOS fails to update. It is assumed that an anomaly occurs in a case that a fourth data sub-code is executed during the execution of the data code of the functional module, at the moment, identifier information corresponding to the fourth data sub-code is target identifier information, and at the moment, "04" may be recorded in the memory. Text information corresponding to "04" is that "it fails to store the FRU information to the BIOS Flash".

It may be seen from the above-mentioned technical solutions that functional modules are constructed according to historical sample data, where the historical sample data includes historical functional modules to which a BIOS serial port information copying problem has occurred. In a case that data codes of the functional modules are executed, positions where problems are prone to occur to the data codes may be used as nodes, there is a difference in node information corresponding to different functional modules, and data codes corresponding to each of the functional modules are divided into data sub-codes according to node information corresponding to each of the functional modules. In order to characterize a running condition of each of the functional modules, a correspondence between the data sub-codes and identifier information may be pre-established, and target identifier information in response to the execution of the data codes of each of the functional modules may be determined by querying the correspondence. In a case that a problem occurs to a certain data sub-code, the functional module may stop at a position of the data sub-code where the problem occurs, thereby enabling the subsequent data sub-codes not to be executed. In the technical solutions, the identifier information corresponding to the current stop position of the functional module may be taken as the target identifier information, and the target identifier information is stored to a preset memory; and abnormal target data sub-codes may be quickly located according to the target identifier information recorded in the memory in a case that an anomaly occurs to BIOS operation, so that problem analysis may be performed on the target data sub-codes, and the problem analysis efficiency is effectively improved.

During practical application, fed-back state information may be received in a case that the target identifier information is written into the memory, and it may be determined, according to the state information, whether the written target identifier information is valid. Therefore, in an embodiment of the present application, after the target identifier information is stored to the preset memory, a state identifier corresponding to the data written into the memory each time may be recorded according to state information fed back after each time of writing data into the memory, where the state identifier includes a valid identifier and an invalid identifier.

Correspondingly, after the abnormal identifier information is selected from all the target identifier information, it may be judged whether the state identifier corresponding to the abnormal identifier information is the valid identifier; and the step that the target data sub-codes corresponding to the abnormal identifier information are determined according to the correspondence between the data sub-codes and the identifier information is performed in a case that the state identifier corresponding to the abnormal identifier information is the valid identifier.

By recording the state identifier corresponding to the abnormal identifier information, it is convenient for a system to quickly recognize the validity of the abnormal identifier information, and thus, the validity of the acquired target data sub-codes may be guaranteed during fault location.

In consideration of a practical application in which a specific cause of the fault may not be clarified according to a target data sub-code where a fault occurs, in an embodiment of the present application, after the abnormal target data sub-codes are located, a serial port information printing function may be set for the target data sub-code.

By setting the serial port information printing function for the target data sub-code, at the moment, the system only needs to print serial port information corresponding to the target data sub-code, but does not need to print all serial port information corresponding to the functional modules, so that the time spent for printing the serial port information is shortened, and the efficiency of analyzing a cause of the fault according to the serial port information is improved.

Figure 2:
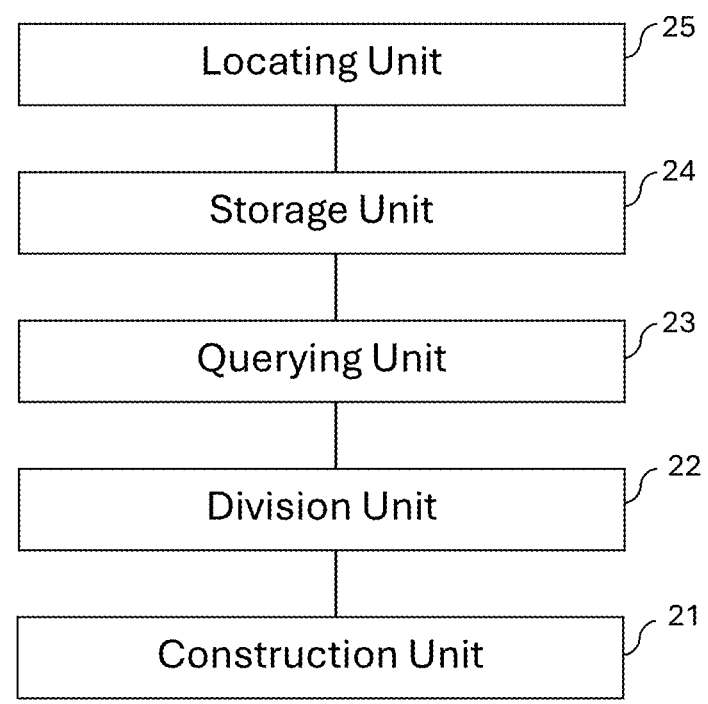
FIG. 2 is a schematic structural diagram of a BIOS problem locating apparatus provided in an embodiment of the present application.

FIG. 2 is a schematic structural diagram of a BIOS problem locating apparatus provided in an embodiment of the present application. The apparatus includes a construction unit 21, a division unit 22, a querying unit 23, a storage unit 24, and a locating unit 25; where the construction unit 21 is configured to construct functional modules according to historical sample data, where the historical sample data includes historical functional modules to which a BIOS serial port information copying problem has occurred;

the division unit 22 is configured to divide data codes corresponding to each of the functional modules into data sub-codes according to node information corresponding to each of the functional modules;

the querying unit 23 is configured to query a pre-established correspondence between the data sub-codes and identifier information to determine target identifier information in response to the execution of the data codes of each of the functional modules;

the storage unit 24 is configured to store the target identifier information to a preset memory; and the locating unit 25 is configured to locate the abnormal target data sub-codes according to the target identifier information recorded in the memory in a case that an anomaly occurs to BIOS operation.

In an embodiment of the present application, the locating unit includes a judgment subunit, a reading subunit, a selection subunit, and a determination subunit; where the judgment subunit is configured to judge, in a case that an anomaly occurs to BIOS operation, whether complete serial port information is acquired within a preset time;

the reading subunit is configured to read the target identifier information corresponding to each of the functional modules from the memory in a case that the complete serial port information is unable to be acquired within the preset time;

the selection subunit is configured to select abnormal identifier information from all the target identifier information; and the determination subunit is configured to determine, according to the correspondence between the data sub-codes and the identifier information, the target data sub-codes corresponding to the abnormal identifier information.

In an embodiment of the present application, the apparatus further includes a conversion unit; where the conversion unit is configured to convert the abnormal identifier information into text information according to a preset correspondence between the identifier information and the text information.

In an embodiment of the present application, the apparatus further includes a recording unit and a judgment unit; where the recording unit is configured to record, according to state information fed back after each time of writing data into the memory, a state identifier corresponding to the data written into the memory each time, where the state identifier includes a valid identifier and an invalid identifier; and the judgment unit is configured to judge whether the state identifier corresponding to the abnormal identifier information is the valid identifier; and trigger the determination subunit to perform, in a case that the state identifier corresponding to the abnormal identifier information is the valid identifier, the step of determining, according to the correspondence between the data sub-codes and the identifier information, the target data sub-codes corresponding to the abnormal identifier information after the step of selecting abnormal identifier information from all the target identifier information.

In an embodiment of the present application, the apparatus further includes a setting unit; where the setting unit is configured to set a serial port information printing function for the target data sub-codes.

In an embodiment of the present application, the storage unit is configured to determine a position to be occupied by each of the functional modules in the memory according to a capacity of the memory, the number of the functional modules and the node information corresponding to each of the functional modules; and store the target identifier information to the position, which corresponds to the target identifier information, in the memory in a case that the target identifier information is acquired.

The description for the features in the embodiment corresponding to FIG. 2 may refer to relevant description for the embodiment corresponding to FIG. 1, and will not be repeated here.

It may be seen from the above-mentioned technical solution that functional modules are constructed according to historical sample data, where the historical sample data includes historical functional modules to which a BIOS serial port information copying problem has occurred. In a case that data codes of the functional modules are executed, positions where problems are prone to occur to the data codes may be used as nodes, there is a difference in node information corresponding to different functional modules, and data codes corresponding to each of the functional modules are divided into data sub-codes according to node information corresponding to each of the functional modules. In order to characterize a running condition of each of the functional modules, a correspondence between the data sub-codes and identifier information may be pre-established, and target identifier information in response to the execution of the data codes of each of the functional modules may be determined by querying the correspondence. In a case that a problem occurs to a certain data sub-code, the functional module may stop at a position of the data sub-code where the problem occurs, thereby enabling the subsequent data sub-codes not to be executed. In the technical solutions, the identifier information corresponding to the current stop position of the functional module may be taken as the target identifier information, and the target identifier information is stored to a preset memory; and abnormal target data sub-codes may be quickly located according to the target identifier information recorded in the memory in a case that an anomaly occurs to BIOS operation, so that problem analysis may be performed on the target data sub-codes, and the problem analysis efficiency is effectively improved.

Figure 3:
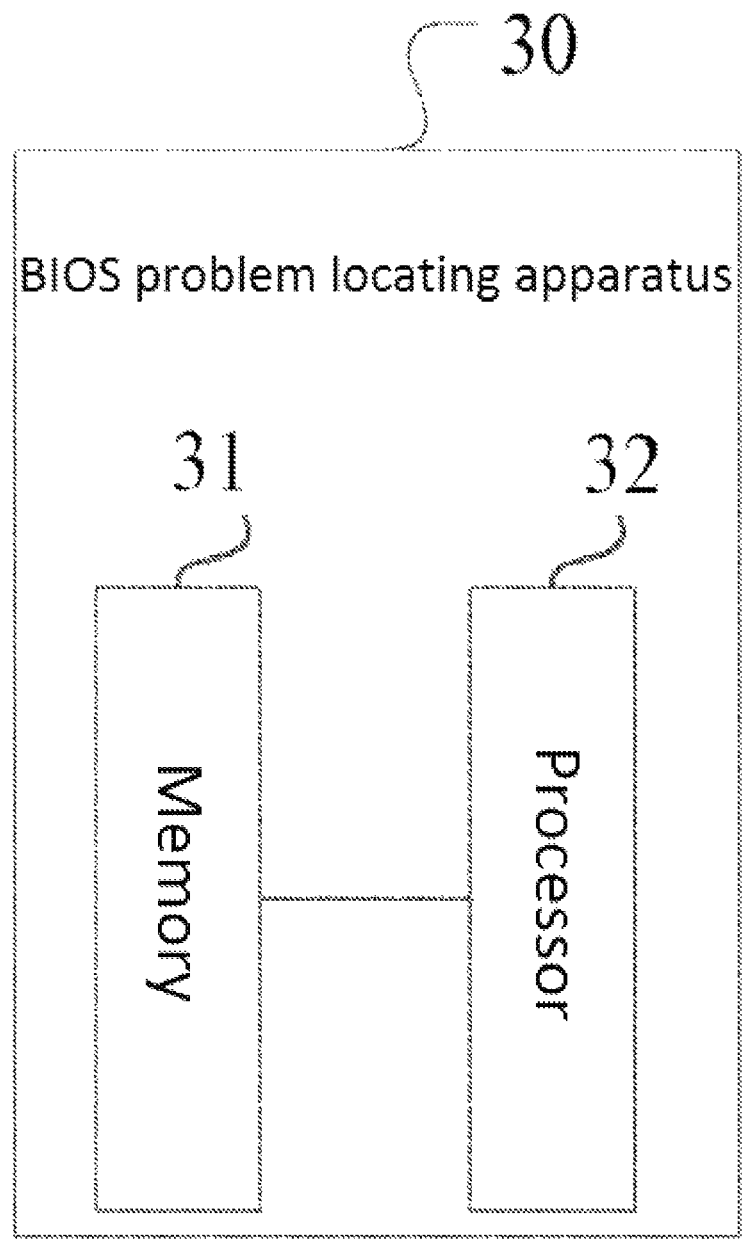
FIG. 3 is a schematic diagram of a hardware structure of a BIOS problem locating apparatus provided in an embodiment of the present application.

FIG. 3 is a schematic diagram of a hardware structure of a BIOS problem locating apparatus 30 provided in an embodiment of the present application. The apparatus includes:

a memory 31 configured to store a computer program; and a processor 32 configured to execute the computer program so as to implement the steps of any one of the BIOS problem locating methods.

An embodiment of the present application further provides a computer-readable storage medium, having stored thereon a computer program which, when executed by a processor, implements the steps of the BIOS problem locating method according to any one of the above-mentioned embodiments.

The BIOS problem locating method and apparatus, and the computer-readable storage medium provided in the embodiments of the present application have been described in detail as above. The embodiments in the description are described in a progressive manner, each embodiment focuses on differences from other embodiments, and the same or similar parts among the embodiments may refer to each other. For the apparatus disclosed in the embodiment, because the apparatus corresponds to the method disclosed in the embodiment, the description of the apparatus is relatively simple, and for relevant parts, reference may be made to the description of the method. It should be noted that for those of ordinary skill in the art, several improvements and modifications may be further made on the present application without departing from the principle of the present application, and these improvements and modifications also fall within the protection scope of the claims of the present application.

Those skilled in the art may further realize that the units and steps of an algorithm in the examples described in conjunction with the embodiments disclosed in the present application may be implemented by electronic hardware, computer software or a combination of both. In order to describe the interchangeability of hardware and software clearly, the composition and steps of the examples have been described generally in the above description according to functions. Whether these functions are implemented by hardware or software depends upon specific applications and design constraints of the technical solutions. Those skilled in the art may adopt different methods for each specific application to implement the described functions, but such implementation should not be considered beyond the scope of the present application.

The steps of the method or algorithm described in conjunction with the embodiments disclosed herein may be performed directly by hardware or a software module executed by a processor or a combination of both. The software module may be disposed in a random access memory (RAM), an internal memory, a read-only memory (ROM), an electrically programmable ROM, an electrically erasable programmable ROM, a register, a hard disk, a removable disk, a CD-ROM or any other form of storage medium known in the technical field.

The invention claimed is:

1. A Basic Input Output System (BIOS) problem locating method, comprising:
constructing functional modules according to historical sample data, wherein the historical sample data comprises historical functional modules to which a BIOS serial port information copying problem has occurred;
dividing data codes corresponding to each of the functional modules into data sub-codes according to node information corresponding to each of the functional modules;
querying a pre-established correspondence between the data sub-codes and identifier information to determine target identifier information in response to the execution of the data codes of each of the functional modules; and storing the target identifier information to a preset memory; and
locating abnormal target data sub-codes according to the target identifier information recorded in the memory in a case that an anomaly occurs to BIOS operation;
wherein the step of locating abnormal target data sub-codes according to the target identifier information recorded in the memory in a case that an anomaly occurs to BIOS operation comprises:
judging, in a case that an anomaly occurs to BIOS operation, whether complete serial port information is acquired within a preset time;
reading the target identifier information corresponding to each of the functional modules from the memory in a case that the complete serial port information is unable to be acquired within the preset time;
selecting abnormal identifier information from all the target identifier information; and
determining, according to the correspondence between the data sub-codes and the identifier information, the target data sub-codes corresponding to the abnormal identifier information.

2. The BIOS problem locating method according to claim 1, wherein after the step of determining, according to the correspondence between the data sub-codes and the identifier information, the target data sub-codes corresponding to the abnormal identifier information, the method further comprises:
converting the abnormal identifier information into text information according to a preset correspondence between the identifier information and the text information.

3. The BIOS problem locating method according to claim 1, wherein after the step of storing the target identifier information to a preset memory, the method further comprises:
recording, according to state information fed back after each time of writing data into the memory, a state identifier corresponding to the data written into the memory each time, wherein the state identifier comprises a valid identifier and an invalid identifier; and
correspondingly, after the step of selecting abnormal identifier information from all the target identifier information, the method comprises:
judging whether the state identifier corresponding to the abnormal identifier information is the valid identifier; and
performing, in a case that the state identifier corresponding to the abnormal identifier information is the valid identifier, the step of determining, according to the correspondence between the data sub-codes and the identifier information, the target data sub-codes corresponding to the abnormal identifier information.

4. The BIOS problem locating method according to claim 3, wherein receiving fed-back state information in a case that the target identifier information is written into the memory.

5. The BIOS problem locating method according to claim 4, wherein judging whether the written target identifier information is valid according to the fed-back state information.

6. The BIOS problem locating method according to claim 3, wherein the state identifier corresponding to the abnormal identifier information is used to recognize the validity of the abnormal identifier information, so as to guarantee the validity of the acquired target data sub-codes during fault-locating.

7. The BIOS problem locating method according to claim 1, wherein after the step of locating abnormal target data sub-codes according to the target identifier information recorded in the memory, the method further comprises:

setting a serial port information printing function for the target data sub-codes.

8. The BIOS problem locating method according to claim 7, further comprising:

printing serial port information corresponding to the target data sub-codes by utilizing the set serial port information printing function.

9. The BIOS problem locating method according to claim 1, wherein the step of storing the target identifier information to a preset memory comprises:

determining a position to be occupied by each of the functional modules in the memory according to a capacity of the memory, the number of the functional modules and the node information corresponding to each of the functional modules; and storing the target identifier information to said position, which corresponds to the target identifier information, in the memory in a case that the target identifier information is acquired.

10. A Basic Input Output System (BIOS) problem locating apparatus, comprising:

a memory configured to store a computer program; and a processor configured to execute the computer program so as to implement the steps of the BIOS problem locating method according to claim 1.

11. A computer-readable storage medium, having stored thereon a computer program which, when executed by a processor, implements the steps of the BIOS problem locating method according to claim 1.

12. The BIOS problem locating method according to claim 1, wherein the step of constructing functional modules according to historical sample data further comprises:

summarizing historical functional modules to which a BIOS serial port information copying problem has occurred within a period of time as the historical sample data.

13. The BIOS problem locating method according to claim 1, wherein the step of dividing data codes corresponding to each of the functional modules into data sub-codes according to node information corresponding to each of the functional modules comprises:

using positions where problems occurred as nodes, wherein one functional module corresponds to at least one node, and summarizing the at least one node as node information corresponding to the functional module.

14. The BIOS problem locating method according to claim 1, wherein identifier information corresponding to the data sub-code where a problem occurs to cause the functional module to stop is taken as the target identifier information in response to the execution of data codes of the functional module.

15. The BIOS problem locating method according to claim 1, wherein when all the functional modules are executed in order, all the functional modules only correspond to one piece of target identifier information, and this piece of target identifier information is stored in one byte of the memory.

16. The BIOS problem locating method according to claim 1, wherein when all the functional modules are not executed in order, an independent byte is allocated to each of the functional modules for storing the target identifier information corresponding to each of the functional modules.

17. The BIOS problem locating method according to claim 1, wherein, in response to the complete serial port information being acquired within the preset time, performing fault-locating according to the serial port information.

18. The BIOS problem locating method according to claim 1, wherein, in response to an abnormal execution of data sub-codes, updating a piece of information acquired from a baseboard management controller (BMC) to the functional module.

19. The BIOS problem locating method according to claim 1, wherein the identifier information is presented in a form of a character string.

* * * * *